April 27, 1954
P. ARBEIT ET AL
2,677,003
GLASS FURNACE
Filed Dec. 31, 1949
2 Sheets-Sheet 2
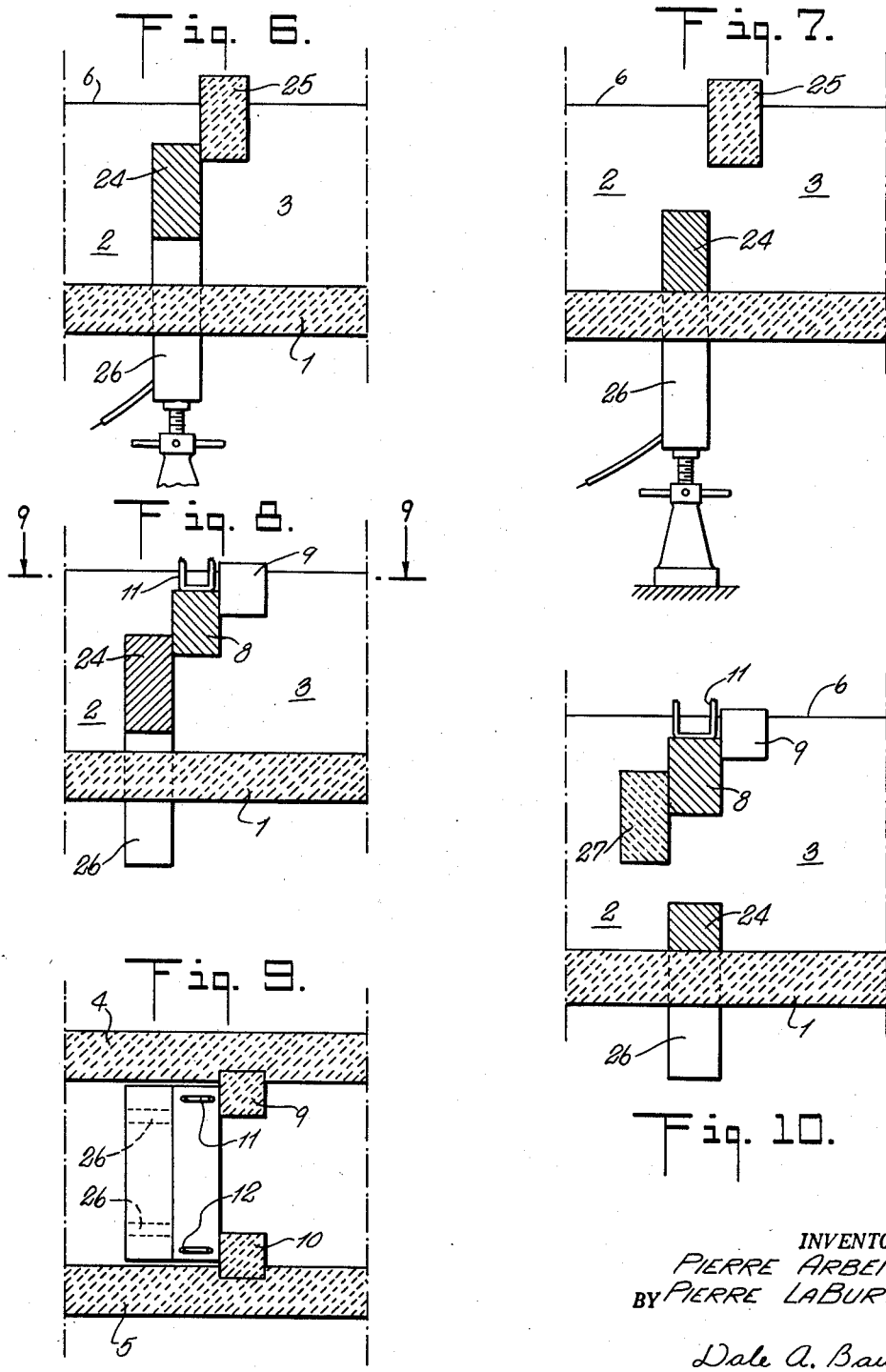
INVENTORS
PIERRE ARBEIT
BY PIERRE LABURTHE
Dale A. Bauer
ATTORNEY Patented Apr. 27, 1954

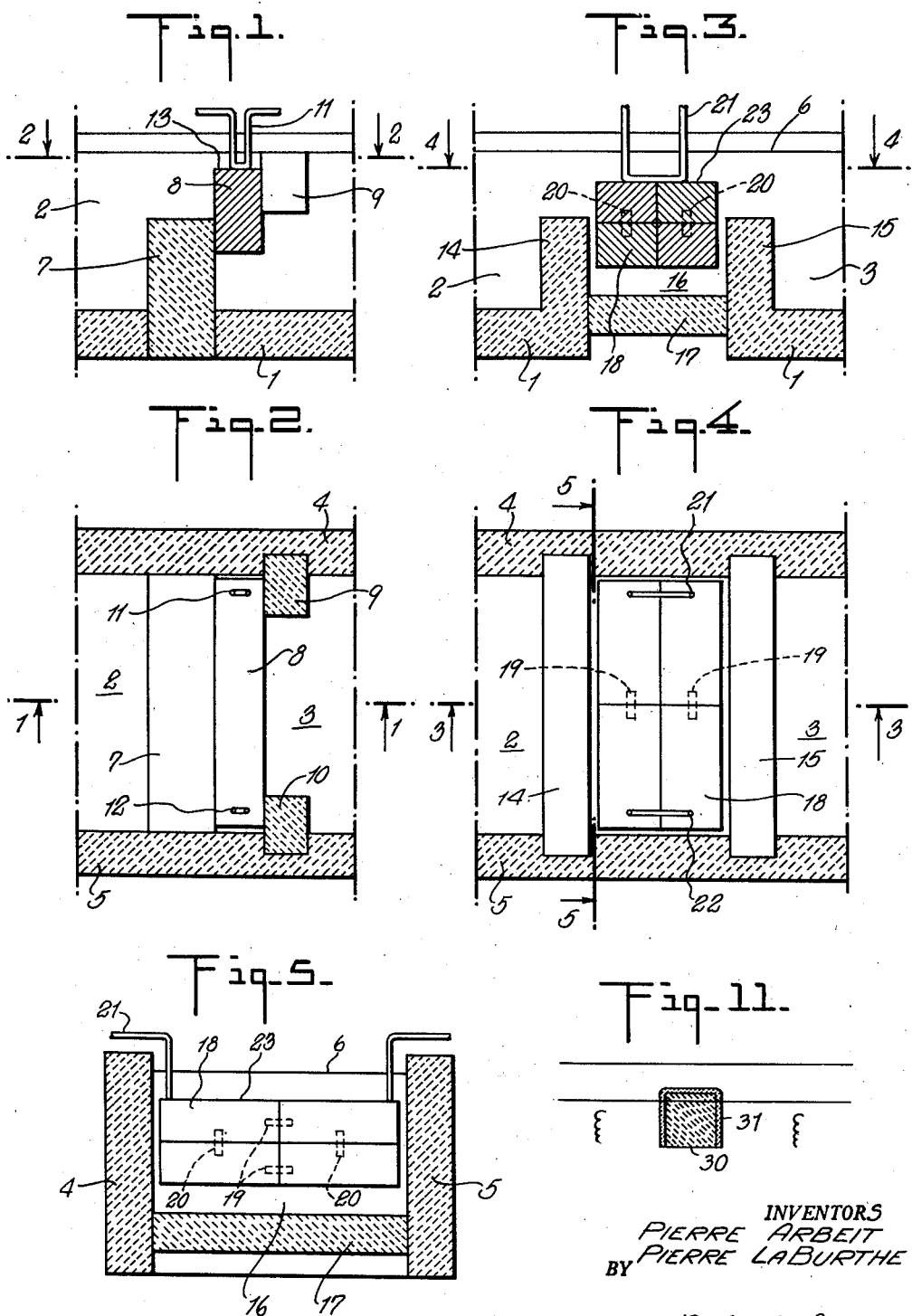

2,677,003

UNITED STATES PATENT OFFICE 2,677,003

GLASS FURNACE

Pierre Arbeit and Pierre La Burthe, Paris, France, assignors to Societe Anonyme des Manufactures des Glaces et Produits Chimiques de Saint-Gobain, Chauny & Cirey, Paris, France Application December 31, 1949, Serial No. 136,276

Claims priority, application France January 4, 1949

23 Claims. (Cl. 13—6)

The present invention relates to tank furnaces for the manufacture of glass which comprise, at least, two compartments separated from each other by a bridgewall or partition, the molten glass passing from one compartment to the following one either over the partition in the form of a shallow layer or through a submerged orifice formed therein. This arrangement of the furnace enables one to subject the glass in each of the compartments to particular treatments, such as melting or fining, which necessitate different conditions of temperature. By the division of the furnace into distinct compartments, it is possible to reduce the longitudinal convection currents which are known, in tanks not provided with compartments, to carry back the glass from downstream colder zones to upstream hotter zones and to cause a useless consumption of heat.

The present invention has for its object to make the partition provided between two compartments of the furnace, or at least a part of said partition, by carbon and particularly by graphite.

Another object of the invention consists in making one or several of the carbon or graphite parts of a bridgewall or partition in the form of vertically movable elements.

According to one embodiment of the invention, the weir provided between two compartments of the furnace is made of carbon or graphite, at least at its upper part, over which the molten glass is caused to flow as a relatively shallow layer comprised between the upper level of the glass bath in the compartments and the upper edge of the partition.

In known furnaces having weirs made of refractory substances over the upper edge of which the molten glass is caused to flow as a shallow stream, it is necessary to protect the upper part of these weirs from attack by the glass and from wear by the friction of the glass stream, this protection being obtained by the use of cooling means which chills the glass. We have found that by constituting the weir, or at least, its upper part, of carbon or graphite, in accordance with the present invention, it is not necessary to protect it or to employ cooling means. Thus the device is simplified and, furthermore, cooling of the glass stream by its contact with the upper part of the weir is avoided.

The invention provides any desired depth or thickness to the glass layer which flows over the weir, without the necessity of special measures for protecting the upper part of this weir. Particularly, that thickness can be as small as is desired, thus enabling the glass layer to be substantially at the same temperature in its whole thickness during the whole working of the furnace. In this case, it is possible to avoid any return of glass from one compartment to the preceding one, which would occur due to the difference of temperature between these two compartments and to the existence of different temperatures in the glass layer itself.

By giving to the weir, constituted in accordance with the present invention, a sufficient length in the direction of the glass flow, and/or, if that part of the furnace is heated to a temperature high enough to ensure the escape of gas bubbles through all the thickness of the glass layer, it is possible to carry out the fining entirely or partly over the weir situated between the melting compartment and the compartment which is usually provided for the fining operation.

The carbon or graphite which constitutes the weir, or at least the part of it over which the glass is caused to flow as a shallow layer, can be used as a conductor of an electric current of heating intensity and, consequently, for heating the glass by contact. Thus, for example, by regulating the intensity of the current it is possible to bring the glass which is in contact with the upper edge of the weir to a temperature as near as desired to that of the upper surface of the glass layer; such a result cannot be performed with the weirs of refractory material heretofore known.

As an example, the graphite element constituting the weir or at least its upper part can be used as a resistor and a high frequency electric current can be caused to pass through it. By reason of the skin effect which is produced in that case the superficial part of the element is carried to a relatively high temperature and heats the glass coming into contact with it so much the more as the frequency is higher.

The graphite element can also be used an as electrode which, by exchanging electrical current with one or more other electrodes through the bath, raises the temperature of the glass contacting the upper edge of the weir.

According to another arrangement which also raises the temperature of the glass passing over the weir, the graphite or carbon element constituting the weir or a part of it can be used as a dead electrode, i. e. an electrode which is not connected with a current source, the lines of electric current passing through the glass mass between two electrodes located on opposite sides of the weir being concentrated by the graphite or carbon element.

According to the invention, the partition between two compartments of the furnace may be formed of a fixed weir of any convenient refractory material, or of carbon or graphite, associated with a movable and adjustable carbon or graphite element which permits one to regulate the thickness of the molten glass layer flowing over the upper edge of this element.

As carbon or graphite is less dense than glass and consequently, floats on it, advantage can be taken of this property to regulate the vertical position of an upper carbon or graphite element of a partition between two compartments. The level of the upper edge of said element can be adjusted by forcing this element more or less into the glass by means of abutments which rest on its upper face and are adjustable in height.

According to another embodiment of the invention, the communication between two compartments can be made through a separating partition by means of one or several orifices, having at least one edge, upper or lower, formed by a graphite element.

According to a further characteristic of the invention, at least one of the graphite elements may be adjustable in height and thus it is possible to fix the position of the orifice at any given distance below the glass level. Moreover the vertical dimension of the orifice, which may be in the form of a slit, can be adjusted.

Several passages can be provided in the partition at different levels. If the partition is made of several elements adjustable in height, the height of each orifice and its distance from the glass level can be varied. Moreover, one or several orifices can be combined with a passage for a shallow layer of glass at the surface of the bath. Owing to the arrangement of passages at different levels, the invention can permit when desired, the passage of a certain and controllable return flow of glass from one compartment to the preceding one.

In order to make the passage or passages adjustable in height according to the invention, advantage can be taken of the buoyancy of the carbon or graphite element or elements to sink them more or less in the glass bath by pressure exerted on their upper faces.

According to the invention, the vertical displacement of one, at least, of the elements of the partition can be actuated from beneath by means of parts passing through the bottom of the tank. For this purpose, advantage is taken of the fact that a carbon and more particularly a graphite element can easily glide through blocks of similar material located in the bottom of the tank, without any flowing of glass through the joints.

If the passage to be made is relatively narrow, the movable element or elements of the partition can be made of graphite and can be vertically moved with respect to the bottom.

When the passage should be larger and, for example, extend as a slot from one side wall of the furnace to the other, the element or elements can be integral with two or more carbon or graphite columns which are the only elements which pass through the bottom of the tank and are adjustable in height.

Amongst the advantages resulting from the use of carbon and particularly of graphite, for making at least one of the lips of the orifices or slots, the following ones can be cited: as graphite is not attacked by molten glass, even at high temperatures, the slots practically remain constant in their shape, during the working run of the furnace. In particular, their height remains constant when they ought to be close together to form a narrow slit.

The electric conductivity of the graphite element or elements of the slot can be used to pass an electric current through the slot and raise the glass to a given temperature.

For that purpose, the graphite can serve either as a resistor, or as an active or dead electrode.

A local and momentary increase of the temperature of the glass in the slot, to reduce the glass viscosity and facilitate the displacement of the graphite element or elements, can be used.

When one or several submerged passages are provided in a partition, the upper part of a partition may emerge from the glass bath, in order to block any current in the free surface of the glass. In this case, the upper part of the partition can be constituted by a fixed piece of a refractory material. This upper part may also be formed of an immersed graphite piece which supports a piece of fire-proof refractory emerging from the glass bath and sufficiently light so that the assembly remains floating and can be adjustable in height as above indicated. The graphite barrier can be coated, at least on the parts that are liable to emerge from the glass, with a protective fire-proof layer, by spraying them with molten aluminum, which becomes oxidized and forms a layer of alumina.

Several embodiments of the present invention are hereafter described, merely by way of examples, and referred to in the accompanying drawings in which:

Fig. 1 is a longitudinal, vertical section on line 1—1 of Fig. 2; and

Fig. 2 is a horizontal section through a part of a tank furnace comprising a weir provided with an upper element of carbon or graphite, which is vertically adjustable in the glass.

Figs. 3, 4 and 5 relate to another embodiment of the invention in which:

Fig. 3 is a longitudinal, vertical section along line 3—3 of Fig. 4.

Fig. 4 is a horizontal section along line 4—4 of Fig. 3; and

Fig. 5 is a vertical cross-section along line 5—5 of Fig. 4.

Figs. 6 and 7 are vertical, longitudinal sections of an embodiment in which the partition is formed of two pieces the upper one of which can be made of refractory material and prevents the passage of glass at the surface of the bath, the lower piece being made of graphite and being vertically movable, thus providing a communication between the two compartments which is adjustable in height.

Fig. 8 is a vertical, longitudinal section of a partition wherein the upper part is made of graphite and can be immersed below the glass level, the lower part also being vertically movable.

Fig. 9 is a horizontal section along line 9—9 of Fig. 8 of said partition.

Fig. 10 is a longitudinal section of a partition formed of three pieces.

Fig. 11 is a fragmentary vertical section through a graphite block protected by a facing of alumina.

In these figures, 1 represents the bottom of the tank furnace, 2 and 3 represent two compartments and 4 and 5 the lateral walls of the furnace, 6 is the glass level.

In Figs. 1 and 2, the compartments 2 and 3 are separated by a weir 7 of ordinary refractory material which reaches a level which is below the level of the partition to be provided. The upper part of the partition is formed by a carbon or graphite parallelepiped block 8 somewhat shorter than the width of the furnace. This block is maintained against the weir 7, with small clearance, by means of refractory pieces 9, 10 integral with or mounted in walls 4 and 5. It is possible to change the depth of submergence of the block 8 to adjust the thickness or depth of the glass sheet flowing over the partition 7—8.

In this embodiment, two U-shaped metal pipes 11 and 12 are provided with a water circulation and rest on the upper surface of block 8, near its two ends, in order to maintain it submerged. By raising or lowering the pipes 11 and 12 the level of the upper edge 13 of this block is adjusted in relation to the glass level 6. The pipes can be used as poles for the passing of current through the float from end to end, making it a resistor, and making them hollow electrodes.

When starting the production of glass in the furnace, the carbon or graphite block 8 is covered with glass, for example, with cullet, in order to preserve it from the oxidizing flames of burners used for heating the furnace and melting the glass, not shown in the drawings.

In the embodiment shown in Figures 3 to 5, two partition walls 14 and 15 are provided; with the side walls 4 and 5 they form a little tank 16 which has a bottom 17, the level of which can be and is shown at a height different from that of compartments 2 and 3. A graphite float 18 enters this tank, which is otherwise filled with glass. This float can be made of several elements (eight in the figure shown) assembled together horizontally and vertically by pins 19 and 20.

The dimensions of this float are so great that it covers almost the entire horizontal area of the tank 16 but it has the clearance which is necessary to enable it to move vertically.

The float 18 is maintained submerged by means of U-shaped metal tubes 21 and 22, through which a current of water flows and which rest on the upper surface of the float near its ends. These pipes are adjustable in height, to regulate the depth of immersion of the upper part 23 of the float. The heights of the partitions 14 and 15 and float 18 are such that a part of the float is always maintained under the upper part of the walls even when the top of the float is practically at the free surface of the glass.

The advantages given by this arrangement are the following:

The walls 14 and 15 limit the longitudinal displacement of the float; a better seal between the two compartments 2 and 3 is obtained with the two partitions than with a single partition such as 7 in Fig. 1; further, it is possible to cool the glass of the tank 16 from beneath in order to make it more viscous and by thus avoiding any glass current between the walls and the float this tightness is still increased. In that way, the upper part of the partition can be made as long as desired in the direction of the glass flow, the thickness of the glass layer can be reduced at will and, by sufficiently heating the glass in that zone, glass fining can be obtained or started over this submerged partition.

Figures 6 and 7 show an embodiment wherein the lower part of the partition is of graphite and vertically movable. This part is formed of a transverse graphite piece 24, the fore-face of which is in the plane of the rear-face of the upper part 25 of the partition. The piece 24 is integral with two vertical graphite columns 26 which can slide through the bottom 1.

According to the height of penetration of these columns, an adjustable slot for the passage of the glass is provided under (Figure 6) or over (Figure 7) the cross beam 24. In Figure 6, the slot is interrupted only by the columns which support the cross-beam. If the height of the cross-beam 24 is less than the distance between the bottom and the lower edge of piece 25, two slots can be formed, the one above, the other under the piece 24.

The Figures 8 and 9 show another embodiment of a partition with a surface passage of the glass over a piece adjustable in height combined with a passage adjustable in height at the level of the bottom. As in Figures 1 and 2, the upper part of the partition is a floating graphite piece 8 butted against two pieces 9 and 10 and dipped into the glass by a U-shaped pipe through which passes a current of water. The cross piece 24, integral with two columns 26—26 movable through the bottom, can slide against the piece 8.

The Figure 10 shows a modification in which the partition is formed of three movable elements 8, 24 and 27, at least piece 8 being made of graphite.

Two passages are shown in this figure. One of them is a surface passage over the partition and the other is at an intermediate level between the upper part and the bottom. The movable element 27 can be moved from above if it is a graphite float, or from beneath, through the bottom, in the same manner as the element 24.

Fig. 11 shows at 30 a graphite float similar to that of Fig. 1 having its upper surface protected by a layer of alumina formed thereon by spraying with molten aluminum and sintering in an oxidizing atmosphere.

It must be understood that the invention is not limited to the above described examples and that other embodiments can be conceived without departing from the scope of the invention.

What is claimed is:

1. A tank furnace for the manufacture of glass comprising at least two compartments separated from each other by a submerged partition leaving, at the surface of the glass bath, a passage for the molten glass flowing from one compartment to the following one, said partition having upper and lower elements, the upper element being made of carbon, and being movable vertically, independently of the lower element, and vertically adjustable, U-shaped and water-cooled metallic pipes bearing on the upper face of the upper element near its ends.

2. A tank furnace for the manufacture of glass comprising at least two compartments separated from each other by two parallel, spaced submerged transverse partitions forming between them a space which is closed at its bottom, a floating weir made of carbon being situated in said space and having its upper edge beneath the surface of the glass bath in order to leave at the surface of the bath a passage for the molten glass flowing from one compartment to the following one.

3. A tank furnace for the manufacture of glass comprising at least two compartments separated from each other by two parallel and distant submerged transverse partitions forming between them a space which is closed at its bottom, a floating weir made of carbon being situated in the space beneath the surface of the glass bath in order to leave, at the surface of the bath, a passage for the molten glass flowing from one compartment to the following one, and means to cool the bottom of said space in order to bring the glass beneath the floating element to a viscous state.

4. A tank furnace for the manufacture of glass comprising a tank along which the glass flows from end to end having at least two compartments separated from each other by a submerged, transversely extending partition leaving, at the surface of the glass bath, a passage for the molten glass flowing from one compartment to the following one, said partition having its upper, glass contacting face formed of carbon, and electrical means to heat the carbon of said partition to assist in fining the glass in contact therewith.

5. A glass furnace having a refractory tank, a partition extending across the tank having a plurality of parts, one of said parts being a graphite barrier extending from wall to wall and having integral columns projecting downwardly through the bottom of the tank, means to move the columns through the bottom to adjust the position of the said one part in the tank, a second of said parts being a graphite barrier extending from wall to wall above said one part, vertically movable, internally cooled metal tubes bearing on the top of said second part, guide means for said second part including refractory abutments one of which is submerged and extends from wall to wall, and means to supply current to a part of said partition, constituting it a heating element for the glass.

6. A glass furnace having a refractory tank provided with a plurality of spaced partitions extending upward from the bottom part way to the glass level, the bottom of the furnace between said partitions being elevated above and thinner than the bottom elsewhere, a movable graphite barrier composed of a plurality of united graphite elements extending from wall to wall of said tank, vertically movable, internally cooled metal tubes bearing on the top of said barrier, and means to supply current to said barrier constituting it a heating element of the furnace.

7. A glass furnace having a refractory tank along which glass flows, a partition extending across the tank, said partition having a plurality of parts each of which extends across the tank and one of which is movable toward and away from the other, means to move the said movable parts, one of said parts comprising a current carrying heating element, and means to supply the said element with current.

8. A tank furnace for the continuous flow manufacture of glass comprising two compartments separated from each other by a transversely aligned partition made of carbon said partition including upper and lower adjustable barriers providing a submerged orifice for the passage of molten glass from one compartment to the following one, means to move said upper barrier vertically and means to move said lower barrier vertically whereby to control the size and the vertical location of said orifice in the furnace.

9. A tank furnace for the manufacture of glass comprising at least two compartments separated during furnace operation by a submerged partition provided with at least one passage for the molten glass, the portion of said partition forming said passage being provided with a graphite face, said partition comprising a barrier mounted on carbon posts slidably projecting through the bottom of the tank.

10. A glass furnace having a refractory tank along which glass flows during manufacture, a partition constituting a weir extending across said tank, said partition having upper and lower, horizontally arranged barriers, the lower of which is movably mounted at the bottom, and means to raise the lower barrier above the bottom of the furnace to provide a passageway beneath the barrier for the flow of glass along the bottom.

11. A glass furnace having a refractory tank along which glass flows during manufacture, a partition constituting a weir extending across said tank, said partition having upper and lower, horizontally arranged sections capable of being brought into overlapping position longitudinally of the furnace beneath the glass level thereof, means to raise and lower the upper section, and means to raise and lower the lower section.

12. A glass furnace having a refractory tank along which glass flows during manufacture, heating means above the glass for heating the surface of the glass, a weir submerged in the glass, extending across the tank, and having an upper face composed of carbon, means to adjust the depth of the carbon face below the level of the glass flowing over the weir, and electrical means to heat said carbon face, whereby the glass flowing over the weir is heated from above by said heating means and from below by said weir.

13. A glass furnace comprising at least two compartments separated from each other beneath the glass level by a partition extending across the tank, constituted by upper and lower horizontally arranged barriers to the glass, the lower of these barriers being vertically adjustable, and at least one of these barriers, delimiting a passageway for the flow of glass, being made of graphite.

14. A tank furnace for the continuous manufacture of glass comprising at least two compartments partially separated from each other by a transversely aligned submerged partition composed of a plurality of upper and lower barrier elements extending across the furnace, means to adjust at least one of said elements vertically with respect to the other of said elements in order to provide a passage between the compartments or to adjust the size of an existing passage, the face of at least one said element beneath the surface of the glass, where it is engaged by the glass passing between compartments, being composed of graphite.

15. A glass furnace having a tank, a submerged partition extending across said tank comprising a submerged fixed barrier and a cooperating, vertically adjustable, floating barrier immersed in the glass, each of which is maintained at least in part beneath the glass level, and means to move the vertically adjustable barrier with respect to the fixed barrier to provide and control the size of an opening for the passage of glass between the parts of the tank on opposite sides of said barrier.

16. A glass furnace having a tank and a carbon barrier extending across the tank, means to submerge the carbon barrier in the glass, and means to protect the upper surface of the barrier against the oxidizing atmosphere of the furnace above the glass consisting of a thin layer of alumina integrally bonded to the carbon barrier.

17. A glass furnace comprising at least two compartments separated from each other by a partition, extending across the tank, constituted by upper and lower, submerged horizontally arranged barriers which extend through the glass in the tank and obstruct its flow along the tank, at least one of these barriers delimiting a passageway for the flow of glass from compartment to compartment, being made of graphite, and being vertically movable to control the size of said passageway, and means to move the said barrier vertically.

18. A tank furnace for the manufacture of glass comprising at least two compartments separated from each other by a partition, the upper surface of which is submerged beneath the surface of the glass bath, forming a passage at the surface of the bath for the molten glass flowing from one compartment to the following one, said partition comprising upper and lower horizontally arranged barrier elements extending transversely of the tank, and means to adjust the upper barrier element vertically with respect to the lower barrier element, said upper element being made of carbon.

19. In a glass furnace in which molten glass flows along the furnace, means extending across the furnace, to obstruct the flow of glass near the bottom of the furnace, means to adjust the said means vertically, vertically movable means extending across the furnace below the glass level and above said means to obstruct glass flowing above the said means, and means to adjust the vertically movable means vertically.

20. In a glass furnace in which glass flows along the furnace, means to stop the flow of glass along the bottom of the furnace and means to raise the said means above the bottom of the furnace whereby to permit glass to flow along the bottom of the furnace.

21. A glass furnace having a tank, a submerged partition extending across said tank comprising a submerged lower barrier extending across said tank from the bottom of the tank part way to the glass level and a cooperating transverse submerged floating barrier of graphite and means for vertically adjusting the floating barrier with respect to the lower barrier.

22. A glass furnace according to claim 21 in which the lower barrier is made of graphite and slidably mounted through the bottom of the tank.

23. A glass furnace according to claim 21 in which the lower barrier is provided with at least one graphite part slidable vertically through the bottom of the tank.

References Cited in the file of this patent

UNITED STATES PATENTS

| Number | Name | Date |
|---|---|---|
| 602,111 | Schluder | Apr. 12, 1898 |
| 698,980 | Luhne | Apr. 29, 1902 |
| 1,166,025 | Wadsworth | Dec. 28, 1915 |
| 1,322,767 | DeVaughn | Nov. 25, 1919 |
| 1,457,718 | Valentine | June 5, 1923 |
| 1,538,215 | Reece | May 19, 1925 |
| 1,594,496 | Clark | Aug. 3, 1926 |
| 1,741,977 | Cornelius | Dec. 31, 1929 |
| 1,761,342 | Hitner | June 3, 1930 |
| 1,815,978 | Hitner | July 28, 1931 |
| 1,933,527 | Wadman | Oct. 31, 1933 |
| 1,944,855 | Wadman | Jan. 23, 1934 |
| 1,979,610 | Ferguson | Nov. 6, 1934 |
| 2,010,055 | Brown | Aug. 6, 1935 |
| 2,013,755 | Hediger | Sept. 10, 1935 |
| 2,018,886 | Ferguson | Oct. 29, 1935 |
| 2,064,546 | Kutchka | Dec. 15, 1936 |
| 2,101,675 | Ferguson | Dec. 7, 1937 |
| 2,122,469 | Hitner | July 5, 1938 |
| 2,198,304 | Cornelius | Apr. 23, 1940 |
| 2,212,528 | Slayter | Aug. 27, 1940 |
| 2,225,616 | Borel | Dec. 24, 1940 |
| 2,225,667 | Staelin | Dec. 24, 1940 |
| 2,227,357 | Martin | Dec. 31, 1940 |
| 2,280,101 | Slayter et al. | Apr. 21, 1942 |
| 2,303,563 | Law | Dec. 1, 1942 |
| 2,331,946 | Von Pazsiczky et al. | Oct. 19, 1943 |
| 2,473,943 | Dunham et al. | June 21, 1949 |
| 2,512,362 | Moberly | June 20, 1950 |

FOREIGN PATENTS

| Number | Country | Date |
|---|---|---|
| 884,518 | France | Apr. 27, 1943 |

OTHER REFERENCES

Ser. No. 196,776, Skaupy et al. (A. P. C.), published Apr. 27, 1943.